US009516005B2

(12) United States Patent
DiRico et al.

(10) Patent No.: US 9,516,005 B2
(45) Date of Patent: Dec. 6, 2016

(54) INDIVIDUAL-SPECIFIC CONTENT MANAGEMENT

(71) Applicant: Sky Socket, LLC, Atlanta, GA (US)

(72) Inventors: John DiRico, Atlanta, GA (US); Erich Stuntebeck, Marietta, GA (US)

(73) Assignee: AirWatch LLC, Atlanta, GA (US)

( * ) Notice: Subject to any disclaimer, the term of this patent is extended or adjusted under 35 U.S.C. 154(b) by 644 days.

(21) Appl. No.: 13/970,776

(22) Filed: Aug. 20, 2013

(65) Prior Publication Data

US 2013/0340060 A1    Dec. 19, 2013

(51) Int. Cl.
| | |
|---|---|
| G06F 17/30 | (2006.01) |
| H04L 29/06 | (2006.01) |
| H04W 12/06 | (2009.01) |
| H04W 12/08 | (2009.01) |
| H04W 4/02 | (2009.01) |
| H04W 4/00 | (2009.01) |

(52) U.S. Cl.
CPC .............. *H04L 63/08* (2013.01); *H04L 63/107* (2013.01); *H04L 63/108* (2013.01); *H04W 12/06* (2013.01); *H04W 12/08* (2013.01); *H04W 4/008* (2013.01); *H04W 4/023* (2013.01)

(58) Field of Classification Search
CPC .......... G06F 21/10; G06F 21/31; G06F 21/32; G06F 21/60; G06F 21/62; G06F 21/121; G06F 21/6218; H04L 63/08; H04L 63/0861; H04W 4/023; H04W 12/06; H04W 12/08; H04W 4/008
USPC ....................... 726/2–7, 26–30; 713/168, 193
See application file for complete search history.

(56) References Cited

U.S. PATENT DOCUMENTS

| | | |
|---|---|---|
| 4,679,226 A | 7/1987 | Muehleisen |
| 5,237,614 A | 8/1993 | Weiss |
| 5,446,888 A | 8/1995 | Pyne |
| 5,574,786 A | 11/1996 | Dayan et al. |
| 5,625,869 A | 4/1997 | Nagamatsu et al. |
| 5,631,947 A | 5/1997 | Wittstein et al. |

(Continued)

FOREIGN PATENT DOCUMENTS

| | | |
|---|---|---|
| CA | 2149337 A1 | 6/1994 |
| GB | 2309860 B | 5/2000 |

(Continued)

OTHER PUBLICATIONS

Asynchrony Software, Inc., , "PDA Defense User Guide", 2002.

(Continued)

*Primary Examiner* — Hosuk Song

(57) ABSTRACT

A method, system, apparatus, and computer program product are provided for facilitating individual-specific content management. For example, a method is provided that includes receiving information regarding at least one prerequisite condition relating to at least one individual, receiving information regarding the at least one individual, determining whether the at least one prerequisite condition is satisfied, and causing individual-specific content associated with the at least one individual to be transmitted. At least a portion of the individual-specific content comprises protected content configured to be unviewable and/or unmodifiable. The method further includes receiving at least one access credential and causing at least a portion of the protected content to be viewable and/or modifiable.

19 Claims, 5 Drawing Sheets

(56) References Cited

U.S. PATENT DOCUMENTS

| | | | |
|---|---|---|---|
| 5,799,068 A | 8/1998 | Kikinis et al. |
| 5,826,265 A | 10/1998 | Van Huben et al. |
| 5,864,683 A | 1/1999 | Boebert et al. |
| 5,870,459 A | 2/1999 | Phillips et al. |
| 5,928,329 A | 7/1999 | Clark et al. |
| 5,961,590 A | 10/1999 | Mendez et al. |
| 5,966,081 A | 10/1999 | Chesnutt |
| 5,974,238 A | 10/1999 | Chase, Jr. |
| 5,987,609 A | 11/1999 | Hasebe |
| 6,021,492 A | 2/2000 | May |
| 6,023,708 A | 2/2000 | Mendez et al. |
| 6,085,192 A | 7/2000 | Mendez et al. |
| 6,131,096 A | 10/2000 | Ng et al. |
| 6,131,116 A | 10/2000 | Riggins et al. |
| 6,151,606 A | 11/2000 | Mendez |
| 6,167,253 A | 12/2000 | Farris et al. |
| 6,233,341 B1 | 5/2001 | Riggins |
| 6,269,369 B1 | 7/2001 | Robertson |
| 6,463,470 B1 | 10/2002 | Mohaban et al. |
| 6,480,096 B1 | 11/2002 | Gutman et al. |
| 6,529,949 B1 * | 3/2003 | Getsin ............... G06F 21/10 380/202 |
| 6,560,772 B1 | 5/2003 | Slinger |
| 6,606,662 B2 | 8/2003 | Nagasaki |
| 6,636,489 B1 | 10/2003 | Fingerhut |
| 6,708,221 B1 | 3/2004 | Mendez et al. |
| 6,714,859 B2 | 3/2004 | Jones |
| 6,726,106 B1 | 4/2004 | Han et al. |
| 6,727,856 B1 | 4/2004 | Hill |
| 6,741,232 B1 | 5/2004 | Siedlikowski et al. |
| 6,741,927 B2 | 5/2004 | Jones |
| 6,766,454 B1 | 7/2004 | Riggins |
| 6,779,118 B1 | 8/2004 | Ikudome et al. |
| 6,904,359 B2 | 6/2005 | Jones |
| 6,965,876 B2 | 11/2005 | Dabbiere |
| 6,995,749 B2 | 2/2006 | Friend |
| 7,017,105 B2 | 3/2006 | Flanagin et al. |
| 7,032,181 B1 | 4/2006 | Farcasiu |
| 7,039,394 B2 | 5/2006 | Bhaskaran |
| 7,039,679 B2 | 5/2006 | Mendez et al. |
| 7,064,688 B2 | 6/2006 | Collins et al. |
| 7,092,943 B2 | 8/2006 | Roese et al. |
| 7,184,801 B2 | 2/2007 | Farcasiu |
| 7,191,058 B2 | 3/2007 | Laird et al. |
| 7,203,959 B2 | 4/2007 | Nachenberg et al. |
| 7,225,231 B2 | 5/2007 | Mendez et al. |
| 7,228,383 B2 | 6/2007 | Friedman et al. |
| 7,275,073 B2 | 9/2007 | Ganji et al. |
| 7,284,045 B1 | 10/2007 | Marl et al. |
| 7,287,271 B1 | 10/2007 | Riggins |
| 7,308,703 B2 | 12/2007 | Wright et al. |
| 7,310,535 B1 | 12/2007 | MacKenzie et al. |
| 7,353,533 B2 | 4/2008 | Wright et al. |
| 7,363,349 B2 | 4/2008 | Friedman et al. |
| 7,363,361 B2 | 4/2008 | Tewari et al. |
| 7,373,517 B1 | 5/2008 | Riggins |
| 7,437,752 B2 | 10/2008 | Heard et al. |
| 7,444,375 B2 | 10/2008 | McConnell et al. |
| 7,447,506 B1 | 11/2008 | MacKenzie et al. |
| 7,447,799 B2 | 11/2008 | Kushner |
| 7,475,152 B2 | 1/2009 | Chan et al. |
| 7,480,907 B1 | 1/2009 | Marolia et al. |
| 7,496,957 B2 | 2/2009 | Howard et al. |
| 7,539,665 B2 | 5/2009 | Mendez |
| 7,565,314 B2 | 7/2009 | Borgeson et al. |
| 7,590,403 B1 | 9/2009 | House et al. |
| 7,594,224 B2 | 9/2009 | Patrick et al. |
| 7,603,547 B2 | 10/2009 | Patrick et al. |
| 7,603,548 B2 | 10/2009 | Patrick et al. |
| 7,603,703 B2 | 10/2009 | Craft et al. |
| 7,617,222 B2 | 11/2009 | Coulthard et al. |
| 7,620,001 B2 | 11/2009 | Ganji |
| 7,620,392 B1 | 11/2009 | Maurya et al. |
| 7,650,491 B2 | 1/2010 | Craft et al. |
| 7,657,746 B2 * | 2/2010 | Paramasivam ....... G06F 21/335 713/168 |
| 7,660,902 B2 | 2/2010 | Graham et al. |
| 7,665,118 B2 | 2/2010 | Mann et al. |
| 7,665,125 B2 | 2/2010 | Heard et al. |
| 7,685,645 B2 | 3/2010 | Doyle et al. |
| 7,702,322 B2 | 4/2010 | Maurya et al. |
| 7,702,785 B2 | 4/2010 | Bruton, III et al. |
| 7,735,112 B2 | 6/2010 | Kim et al. |
| 7,735,122 B1 | 6/2010 | Johnson et al. |
| 7,739,334 B1 | 6/2010 | Ng et al. |
| 7,752,166 B2 | 7/2010 | Quinlan et al. |
| 7,788,382 B1 | 8/2010 | Jones et al. |
| 7,792,297 B1 | 9/2010 | Piccionelli et al. |
| 7,840,631 B2 | 11/2010 | Farcasiu |
| 7,873,959 B2 | 1/2011 | Zhu et al. |
| 7,890,091 B2 | 2/2011 | Puskoor et al. |
| 7,912,896 B2 | 3/2011 | Wolovitz et al. |
| 7,917,641 B2 | 3/2011 | Crampton |
| 7,970,386 B2 | 6/2011 | Bhat et al. |
| 8,001,082 B1 | 8/2011 | Muratov |
| 8,012,219 B2 | 9/2011 | Mendez et al. |
| 8,041,776 B2 | 10/2011 | Friedman et al. |
| 8,046,823 B1 | 10/2011 | Begen et al. |
| 8,060,074 B2 | 11/2011 | Danford et al. |
| 8,069,144 B2 | 11/2011 | Quinlan et al. |
| 8,078,157 B2 | 12/2011 | Maurya et al. |
| 8,094,591 B1 | 1/2012 | Hunter et al. |
| 8,117,344 B2 | 2/2012 | Mendez et al. |
| 8,150,431 B2 | 4/2012 | Wolovitz et al. |
| 8,201,216 B2 * | 6/2012 | Cha ................. G06F 21/10 707/708 |
| 8,225,381 B2 | 7/2012 | Lemke |
| 8,955,038 B2 * | 2/2015 | Nicodemus ........... G06F 21/55 717/172 |
| 2002/0013721 A1 | 1/2002 | Dabbiere et al. |
| 2002/0055967 A1 | 5/2002 | Coussement |
| 2002/0098840 A1 | 7/2002 | Hanson et al. |
| 2003/0065934 A1 | 4/2003 | Angelo et al. |
| 2003/0110084 A1 | 6/2003 | Eberhard et al. |
| 2003/0172166 A1 | 9/2003 | Judge et al. |
| 2003/0186689 A1 | 10/2003 | Herle et al. |
| 2003/0204716 A1 | 10/2003 | Rockwood et al. |
| 2004/0098715 A1 | 5/2004 | Aghera et al. |
| 2004/0123153 A1 | 6/2004 | Wright et al. |
| 2004/0181687 A1 | 9/2004 | Nachenberg et al. |
| 2004/0224703 A1 | 11/2004 | Takaki et al. |
| 2005/0003804 A1 | 1/2005 | Huomo et al. |
| 2005/0246192 A1 | 11/2005 | Jauffred et al. |
| 2006/0190984 A1 | 8/2006 | Heard et al. |
| 2007/0033397 A1 | 2/2007 | Phillips, II et al. |
| 2007/0093243 A1 | 4/2007 | Kapadekar et al. |
| 2007/0136492 A1 | 6/2007 | Blum et al. |
| 2007/0156897 A1 | 7/2007 | Lim |
| 2007/0174433 A1 | 7/2007 | Mendez et al. |
| 2007/0288637 A1 | 12/2007 | Layton et al. |
| 2008/0133712 A1 | 6/2008 | Friedman et al. |
| 2008/0134305 A1 | 6/2008 | Hinton et al. |
| 2008/0201453 A1 | 8/2008 | Assenmacher |
| 2009/0036111 A1 | 2/2009 | Danford et al. |
| 2009/0144632 A1 | 6/2009 | Mendez |
| 2009/0198997 A1 | 8/2009 | Yeap et al. |
| 2009/0260064 A1 | 10/2009 | McDowell et al. |
| 2009/0300739 A1 | 12/2009 | Nice et al. |
| 2009/0307362 A1 | 12/2009 | Mendez et al. |
| 2010/0005125 A1 | 1/2010 | Mendez et al. |
| 2010/0005157 A1 | 1/2010 | Mendez et al. |
| 2010/0005195 A1 | 1/2010 | Mendez et al. |
| 2010/0023630 A1 | 1/2010 | Mendez et al. |
| 2010/0100641 A1 | 4/2010 | Quinlan et al. |
| 2010/0120450 A1 | 5/2010 | Herz |
| 2010/0144323 A1 | 6/2010 | Collins et al. |
| 2010/0146269 A1 | 6/2010 | Baskaran |
| 2010/0254410 A1 | 10/2010 | Collins |
| 2010/0268844 A1 | 10/2010 | Quinlan et al. |
| 2010/0273456 A1 | 10/2010 | Wolovitz et al. |
| 2010/0299152 A1 | 11/2010 | Batchu et al. |
| 2010/0299362 A1 | 11/2010 | Osmond |
| 2010/0299376 A1 | 11/2010 | Batchu et al. |

(56) References Cited

U.S. PATENT DOCUMENTS

| | | |
|---|---|---|
| 2010/0299719 A1 | 11/2010 | Burks et al. |
| 2011/0004941 A1 | 1/2011 | Mendez et al. |
| 2011/0082900 A1 | 4/2011 | Nagpal et al. |
| 2011/0113062 A1 | 5/2011 | Quinlan et al. |
| 2011/0145932 A1 | 6/2011 | Nerger et al. |
| 2011/0153779 A1 | 6/2011 | Mendez et al. |
| 2011/0153799 A1 | 6/2011 | Ito |
| 2011/0167474 A1 | 7/2011 | Sinha et al. |
| 2011/0202589 A1 | 8/2011 | Piernot et al. |
| 2011/0225252 A1 | 9/2011 | Bhat et al. |
| 2011/0270799 A1 | 11/2011 | Muratov |
| 2011/0276805 A1 | 11/2011 | Nagpal et al. |
| 2011/0296186 A1 | 12/2011 | Wong et al. |
| 2011/0320552 A1 | 12/2011 | Friedman et al. |
| 2012/0005578 A1 | 1/2012 | Hawkins |
| 2012/0015644 A1 | 1/2012 | Danford et al. |
| 2012/0102392 A1 | 4/2012 | Reesman et al. |
| 2012/0198547 A1 | 8/2012 | Fredette et al. |
| 2013/0152169 A1 | 6/2013 | Stuntebeck |

FOREIGN PATENT DOCUMENTS

| | | |
|---|---|---|
| GB | 2346716 A | 8/2000 |
| JP | 07141245 A | 6/1995 |
| JP | 08251660 A | 9/1996 |
| WO | 9704389 A1 | 2/1997 |
| WO | 9922322 A1 | 5/1999 |
| WO | 0241661 A2 | 5/2002 |

OTHER PUBLICATIONS

Belani, Eshwar et al., "The CRISIS Wide Area Security Architecture", 1998.
Benaloh, Josh et al., "Patient Controlled Encryption: Ensuring Privacy of Electronic Medical Records", Nov. 13, 2009.
Fox, Armando et al., "Security on the Move: Indirect Authentication Using Kerberos", 1996.
Gong, Li et al., "Multicast Security and Its Extension to a Mobile Environment", Oct. 1995.
Infinite Technologies, , "Infinite Interchange", 1997.
Kiiskinen, Jani et al., "Data Channel Service for Wireless Telephone Links", Jan. 1996.
Latedroid, , "JuiceDefender", Jan. 15, 2012.
Menaria, Pankaj et al., "Security in Mobile Database Systems", Mar. 17, 2011.
Nokia, , "Nokia 9000i Owner's Manual", 1997.
Pfitzmann, Andreas et al., "Mobile User Devices and Security Modules: Design for Trustworthiness", Feb. 5, 1996.
Ratner, David et al., "Replication Requirements in Mobile Environments", Nov. 2001.
Ratner, David H. , "Roam: A scalable Replication System for Mobile and Distributed Computing", Jan. 1998.
Research in Motion, , "Blackberry Wireless Handheld 5810 Getting Started Guide", Jan. 15, 2003.
Research in Motion, , "Blackberry Wireless Handheld 5810 Quick Reference Guide", 2003.
Research in Motion, , "Blackberry Wireless Handheld 5810 User Guide", 2003.
Stajano, Frank et al., "The Thinnest of Clients: Controlling It All Via Cellphone", Mobile Computing and Communications Review, vol. 2, No. 4, Oct. 1998.
Steiner, Jennifer , "Kerberos: An Authentication Service for Open Network Systems", Jan. 12, 1988.
Strunk, John et al., "Self-Securing Storage: Protecting Data in Compromised Systems", Symposium on Operating Systems Design and Implementation, 2000.
Sybase, , "MobiLink Synchronization User's Guide", Part No. 38132-01-0800-01, Nov. 2001.
Symantec Corporation, , "Creating Norton pcAnywhere Scripts", 1994.
Traveling Software, Inc., , "LapLink for Windows 95", 1996.
Wachowicz, Moniza et al., "Combning Location and Data Management in an Environment for Total Mobliity", In Proceedings of the International Workshop on Information Visualization and Mobile Computing, 1906.
Xcellenet, Inc., , "RemoteWare Client for Windows NT and Windows 95 User's Guide", 1996.
Xcellenet, Inc., , "RemoteWare Forms and RemoteWare Query", 1994.
Xcellenet, Inc., "RemoteWare Forms Getting Started Guide", 1994.
Xcellenet, Inc., , "RemoteWare Server for Windows NT", 1996.
Xcellenet, Inc., ,"RemoteWare Server for Windows NT", 1996.
Xcellenet, Inc, , "RemoteWare Server Operations Guide", 1992.

\* cited by examiner

INDIVIDUAL-SPECIFIC CONTENT MANAGEMENT

REFERENCES TO RELATED APPLICATIONS

This application contains subject matter related to that disclosed in U.S. patent application Ser. No. 13/396,356, entitled "Controlling Distribution of Resources on a Network" and filed on Feb. 14, 2012; U.S. patent application Ser. No. 13/623,627, entitled "Controlling Distribution of Resources on a Network" and filed Sep. 20, 2012; U.S. patent application Ser. No. 13/830,708, entitled "Distribution of Variably Secure Resources in a Networked Environment" and filed Mar. 14, 2013; U.S. patent application Ser. No. 13/922,665, entitled "Securing Access to Resources on a Network" and filed Jun. 20, 2013; and U.S. patent application Ser. No. 13/828,922, entitled "Controlling Electronically Communicated Resources" and filed Mar. 14, 2013, all of which are incorporated in their entirety by reference.

FIELD OF APPLICATION

Embodiments of the present invention relate generally to content management and, more particularly, to systems, methods, apparatuses, and computer program products for providing individual-specific content management.

BACKGROUND

Managing access to and distribution of electronic content, such as documents, databases, records, or the like, in a networked environment is critical to ensuring that only authorized users and network-connected devices may gain access to sensitive information. Depending on the sensitivity of any given content, an array of authorization rules may be necessary to ensure that the content is adequately protected. Some content may only require ensuring that a proper user is requesting the resource. Other content may require compliance with more stringent authorization rules, such as determining whether the content is accessed over a secure network or via a secured device.

When dealing with content such as medical records, financial records, or other content that may pertain to an individual and contain confidential and/or personal information, even more advanced control over its distribution may be desired. To date, content management solutions have not addressed the unique security concerns for such individual-specific content.

SUMMARY

This Summary is provided to introduce a selection of concepts in a simplified form that are further described below in the Detailed Description. This Summary is not intended to identify key features or essential features of the claimed subject matter. Neither is this Summary intended to be used to limit the claimed subject matter's scope.

According to one example embodiment, a method is provided that includes receiving information regarding at least one prerequisite condition relating to at least one individual, receiving information regarding the at least one individual, and determining, based at least in part on the information regarding the at least one prerequisite condition and the information regarding the at least one individual, whether the at least one prerequisite condition is satisfied. The method further includes causing individual-specific content associated with the at least one individual to be transmitted, at least a portion of the individual-specific content comprising protected content that is configured to be unviewable and/or unmodifiable via at least one user device. The method even further includes receiving at least one access credential and causing, following receiving the at least one access credential, at least a portion of the protected content to be viewable and/or modifiable via the at least one user device.

According to another example embodiment, an apparatus is provided that includes at least one processor and at least one memory storing program code instructions. The at least one memory and program code instructions of the example embodiment are configured to, with the at least one processor, direct the apparatus to at least receive information regarding at least one prerequisite condition relating to at least one individual, receive information regarding the at least one individual, and to determine, based at least in part on the information regarding the at least one prerequisite condition and the information regarding the at least one individual, whether the at least one prerequisite condition is satisfied. The apparatus is further directed to cause individual-specific content associated with the at least one individual to be transmitted, at least a portion of the individual-specific content comprising protected content that is configured to be unviewable and/or unmodifiable via at least one user device. The apparatus is further directed to receive at least one access credential, and cause, following receiving the at least one access credential and determining that the at least one prerequisite condition is satisfied, at least a portion of the protected content to be viewable and/or modifiable via the at least one user device.

According to yet another example embodiment, a computer program product is provided, the computer program product including a computer-readable storage medium having program code portions embodied therein. The program code portions of the example embodiment are configured to, upon execution, direct the apparatus to at least receive information regarding at least one prerequisite condition relating to at least one individual, receive information regarding the at least one individual, and to determine, based at least in part on the information regarding the at least one prerequisite condition and the information regarding the at least one individual, whether the at least one prerequisite condition is satisfied. The apparatus is further directed to cause individual-specific content associated with the at least one individual to be transmitted, at least a portion of the individual-specific content comprising protected content that is configured to be unviewable and/or unmodifiable via at least one user device. The apparatus is further directed to receive at least one access credential, and cause, following receiving the at least one access credential and determining that the at least one prerequisite condition is satisfied, at least a portion of the protected content to be viewable and/or modifiable via the at least one user device.

According to another example embodiment, an apparatus is provided that includes means for receiving information regarding at least one prerequisite condition relating to at least one individual, means for receiving information regarding the at least one individual, and means for determining, based at least in part on the information regarding the at least one prerequisite condition and the information regarding the at least one individual, whether the at least one prerequisite condition is satisfied. The apparatus further includes means for causing individual-specific content associated with the at least one individual to be transmitted, at least a portion of the individual-specific content comprising protected content that is configured to be unviewable and/or unmodifiable via at least one user device. The apparatus also includes means for receiving at least one access credential, and means for causing, following receiving the at least one access credential and determining that the at least one prerequisite condition is satisfied, at least a portion of the protected content to be viewable and/or modifiable via the at least one user device.

It is to be understood that both the foregoing general description and the following detailed description are examples and explanatory only, and should not be considered to restrict the disclosure's scope, as described and claimed. Further, features and/or variations may be provided in addition to those set forth herein. For example, embodiments of the disclosure may be directed to various feature combinations and sub-combinations described in the detailed description.

BRIEF DESCRIPTION OF THE DRAWINGS

Many aspects of the present disclosure can be better understood with reference to the following diagrams. The drawings are not necessarily to scale. Instead, emphasis is placed upon clearly illustrating certain features of the disclosure. Moreover, in the drawings, like reference numerals designate corresponding parts throughout the several views. In the drawings.

DETAILED DESCRIPTION

Figure 1:
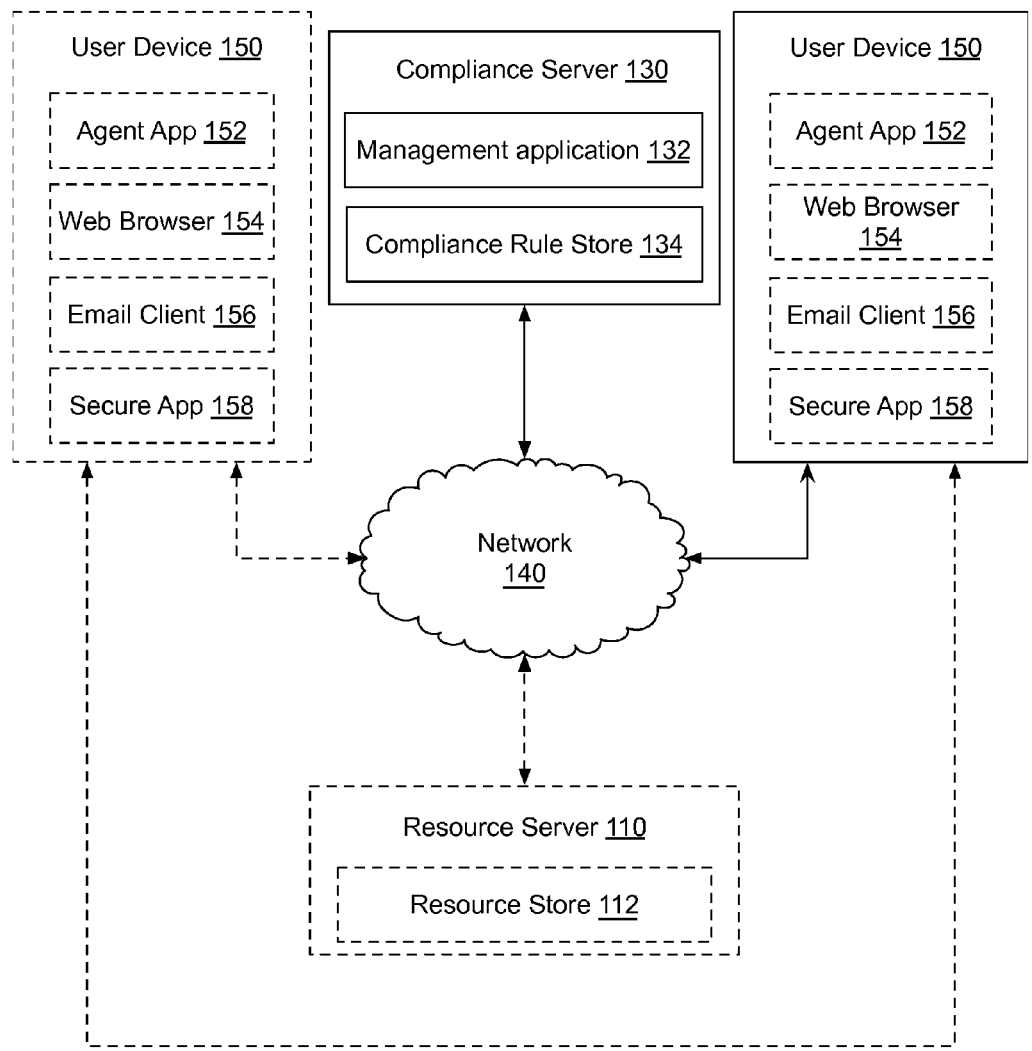
FIG. 1 is a schematic representation of an example system which may be configured according to example embodiments of the present invention.

The present invention now will be described more fully hereinafter with reference to the accompanying drawings, in which some, but not all embodiments of the inventions are shown. Wherever possible, the same reference numbers are used in the drawings and the following description to refer to the same or similar elements. While embodiments of the disclosure may be described, modifications, adaptations, and other implementations are possible. For example, substitutions, additions, subtractions and/or modifications may be made to the elements illustrated in the drawings, as indicated in some cases via dashed lines, and the methods described herein may be modified by substituting, reordering, or adding stages to the disclosed methods. Indeed, the present invention may be embodied in many different forms and should not be construed as limited to the embodiments set forth herein; rather, these embodiments are provided so that this disclosure will satisfy applicable legal requirements. Accordingly, the following detailed description does not limit the disclosure. Instead, the proper scope of the disclosure is defined by the appended claims.

As used herein, the terms "data," "content," "information," and similar terms may be used interchangeably to refer to data capable of being transmitted, received, processed and/or stored in accordance with embodiments of the present invention. Thus, use of any such terms should not be taken to limit the spirit and scope of embodiments of the present invention.

Additionally, as the term will be used herein, "circuitry" may refer to hardware-only circuit implementations (e.g., implementations in analog circuitry and/or digital circuitry); combinations of circuits and computer program product(s) including software and/or firmware instructions stored on one or more, i.e., at least one, computer readable memories that work together to cause an apparatus to perform one or more functions described herein; and circuits, such as, for example, one or more microprocessors or portions of one or more microprocessors, that require software or firmware for operation even if the software or firmware is not physically present. This definition of "circuitry" is applicable to all uses of this term, including in any claims. As another example, the term "circuitry" also includes implementations comprising one or more processors and/or portion(s) thereof and accompanying software and/or firmware. As another example, the term "circuitry" also includes, for example, an integrated circuit or applications processor integrated circuit for a portable communication device or a similar integrated circuit in a server, a network device, and/or other computing device.

As defined herein, a "computer-readable storage medium" refers to a non-transitory physical storage medium (e.g., volatile or non-volatile memory device), and can be differentiated from a "computer-readable transmission medium," which refers to an electromagnetic signal. Furthermore, "at least one" and "one or more" both, as used herein, refer to any non-zero quantity and will be used interchangeably herein.

The present application is generally directed to content management and, more particularly, to systems, methods, apparatuses, and computer program products for providing individual-specific content management. As used herein, individual-specific content refers to content associated with (e.g., belonging to, relating to, and/or pertaining to) at least one particular individual, the viewing and/or modification of which the at least one particular individual would desire or expect to exercise some degree of control over. Common examples of individual-specific content would include content containing an individual's private, personal, and/or confidential information, such as electronic medical records, individually identifiable health information, electronic financial records, or the like.

Example embodiments of such individual-specific content management systems, methods, apparatuses, and computer program products may be configured to manage access to individual-specific content, such as electronic records or other types of content pertaining to at least one individual. For example, embodiments may be configured to control access to protected content by requiring one or more prerequisite conditions related to the individual to be satisfied either before the content is transmitted or before the content is rendered capable of being viewed and/or modified. The prerequisite conditions may, for example, involve a manifestation of the individual's physical presence and/or consent. For instance, electronic medical records pertaining to a particular patient may be transmitted to a doctor's device for viewing only if the particular patient is scheduled for an appointment at a given time or is within a predetermined proximity of the doctor's device. Numerous other such examples are also possible according to example embodiments, some of which will be described below.

Other example embodiments may additionally or alternatively be configured to protect individual-specific content by only rendering the content viewable and/or modifiable upon receiving of an access credential, such as an access credential associated with the individual. Such an access credential may, for example, comprise an identifier known to the individual, such as a social security number, password, PIN or the like; a code, such as may be provided via a wireless transmitter, a security token, a radio frequency ID (RFID) tag, a quick response (QR) code, or the like; or various other types of access credentials. Other example embodiments may, for example, employ access credentials associated with a user receiving the individual-specific content, a system admin, or the like. Other example embodiments may additionally or alternatively be configured to cause the individual-specific content to again be made unviewable and/or unmodifiable following an occurrence of a predetermined event, such as upon expiration of a predetermined period of time or upon the individual moving outside of a predefined location or outside of a predefined proximity from a device viewing the individual-specific content associated with them.

Having thus provided an overview of features and/or functionality which may be provided according to some example embodiments, attention will now be turned to the Figures so that certain example embodiments may be described in more detail.

FIG. 1 illustrates a block diagram of an example individual-specific content management system. While FIG. 1 illustrates one example configuration of such a system, numerous other configurations may be used according to example embodiments of the present invention. With reference to FIG. 1, however, the autonomous device communication system may include at least one user device(s) 150, and at least one compliance server 130. A resource server 110 and/or other network elements may additionally be provided according to some example embodiments.

The user device(s) 150 may comprise any electronic device configured to communicate over one or more networks, such as the network 140 depicted in FIG. 1. For example, the user device(s) 150 may comprise one or more electronic devices such as a mobile telephone, smartphone, tablet computer, PDA, pager, desktop or laptop computer, a set-top box, a music player, a game console, or any of numerous other fixed or portable communication devices, computation devices, content generation devices, content consumption devices, or combinations thereof.

The resource server 110 may, for example, comprise any type of network-accessible electronic device or system that includes storage, such as the depicted resource store 112. The resource server 110 may, according to one example embodiment, comprise a public server that may be accessible to anyone who connects to it over a network, such as the network 140. According to another example embodiment, the resource server 110 may be a private server accessible only over a private network, such as the network 140, and/or may be located behind a firewall. According to another example embodiment, the resource server 110 may additionally or alternatively require user registration and/or may require use of an authorized user device 150, to access it. The resource server 110 may store any type of data, such as various types of general or individual-specific content, applications, records, and/or any other data. For purposes of convenience, the resource server 110 is referred to herein in the singular, although it will be understood that a plurality of servers may be employed in the arrangements as descried herein. Furthermore, in some embodiments, multiple compliance servers 130 may operate on the same server computer. The components executed on the compliance server 130, for example, may comprise various applications, services, processes, systems, engines, or functionality not disclosed in detail herein.

The compliance server 130 may be any type of network-accessible electronic device or system that includes storage, such as the depicted compliance rule store 134, and may be configured to communicate with the user device(s) 150, and/or the resource server 110 over one or more networks, such as the network 140 depicted in FIG. 1, to provide content and/or device management capabilities. For example, the compliance server 130 may comprise cloud-based solutions, server computers and/or any other system providing device management capability. For purposes of convenience, the compliance server 130 is referred to herein in the singular, although it will be understood that a plurality of servers may be employed in the arrangements as descried herein. Furthermore, in some embodiments, multiple compliance servers 130 may operate on the same server computer. The components executed on the compliance server 130, for example, may comprise various applications, services, processes, systems, engines, or functionality not disclosed in detail herein. The compliance server 130 may, according to some example embodiments, be configured to direct the resource server 110 to transmit data or content, e.g., to one or more user devices 150.

The compliance server 130 may comprise a management application 132 and a compliance rule store 134 storing one or more compliance rules, e.g., compliance policies, that may be applicable to the user device(s) 150. While the management application 132 is shown as within the compliance server 130, the management application 132 may additionally or alternately be within the user device(s) 150, and/or remotely located on the resource server 110 and may be remotely updated, such as periodically, via compliance server 130 according to any number of suitable over-the-air (OTA) updating methods.

Attempts by the user device(s) 150 to perform certain functionality, such as viewing, modifying, transmitting, and/or receiving content, e.g., protected and/or individual-specific content, may require the user device to be in compliance with one or more of the compliance rules. Depending on the sensitivity and/or nature of a given functionality, different compliance rules may be necessary to ensure that the functionality is adequately restricted. Some functionality may only require ensuring that the proper user is requesting the functionality. Other functionality may require compliance with more stringent authorization rules, such as determining whether the functionality is restricted during certain time windows or geographic areas. Accordingly, the user device(s) 150 and/or the compliance server 130 may be operative to determine whether the user of the user device 150 is authorized to perform requested functionality at the time the user requests to perform such functionality.

Compliance server 130 may, for example, use the compliance rules to impose hardware restrictions regarding the use of specific devices and/or specific device features, such as, for instance, cameras, Bluetooth, IRDA, tethering, external storage, a mobile access point, and/or other hardware restrictions. The compliance rules may additionally or alternatively impose software restrictions such as the use of specific wireless device operating systems or applications, internet browser restrictions, screen capture functionality, and/or other software restrictions. Mobile device management restrictions may additionally or alternatively be included in the compliance rules and may comprise encryption requirements, firmware versions, remote lock and wipe functionalities, logging and reporting features, GPS tracking, and/or other mobile device management features.

The compliance server 130 may determine whether one or more device characteristics of a requesting device e.g., the user device(s) 150, satisfy one or more of the restrictions enumerated in the compliance rules. For example, the compliance server 130 may determine that a requesting device that has a camera, BLUETOOTH capability, and is executing a specified version of an operating system is compliant with the compliance rules. As another example, the compliance server 130 may determine that a requesting device that is associated with an external storage unit and has screen capture functionality enabled is not compliant with the compliance rules.

In some embodiments, an agent application 152 executed on the user device(s) 150 may make the compliance determination based on a device profile (e.g., the device profile 252 depicted in FIG. 2), credentials, and/or user preferences. For instance, the agent application 152 may monitor calls by applications, such as the web browser 154, email client 156, secure application 158, and/or any other application, on the user device 150 to an operating system, e.g., the operating system depicted in FIG. 2, of the user device 150 to determine whether the user device 150 seeks to perform functionality associated with one and/or more of the compliance rules described above, such as viewing, modifying, transmitting, and/or receiving content, and/or the like. Additionally, the agent application 152 executed on the user device(s) 150 may approve and/or deny the associated functionality requests. For instance, the agent application 152 may instruct the operating system on the user device(s) 150 to prevent the device from viewing, modifying, transmitting, and/or receiving content in response to a determination that a compliance rule, e.g., one or more of the compliance rules 258 stored in the data store 252 depicted in FIG. 2, specifies that such a responsive is not authorized.

In some embodiments, the agent application 152 executed on the user device(s) 150 may rely on the compliance server 130 to determine whether a given functionality of the device, such as viewing, modifying, transmitting, and/or receiving content, is authorized according to the compliance rules. For instance, the agent application 152 may transmit information, such as a device profile, access credentials, information regarding one or more prerequisite conditions, and/or information regarding one or more individuals to the compliance server 130 so that compliance server 130 may determine whether the user device 150 seeks to perform functionality that may violate a given compliance rule. Additionally, the compliance server 130 may approve and/or deny the associated functionality requests. For instance, the compliance server 130 may instruct the agent application 152 on the user device(s) 150 to instruct the operating system on the user device 150 to cause or allow content to be viewed, modified, received, and/or transmitted. In other cases, the compliance server 130 might instruct the agent application 152 to not allow content to be viewed, modified, transmitted, and/or received, depending on applicable compliance rules.

In some embodiments, the compliance rules may comprise device settings and/or executable instructions that define which functionality the operating system of the user device(s) 150 is authorized to perform. Furthermore, the compliance rules may comprise a list of functions, such as those provided by APIs associated with the operating system and/or a platform library, such as the platform library 240 depicted in FIG. 2, that may be treated as protected functions. Viewing, modifying, receiving, and/or transmitting content may, for example, comprise or otherwise be associated with one or more of these functions. Calls to these functions, such as calls to retrieve login credentials, or attempts to interact with (e.g., view, modify, transmit or receive) content, may result in checks by the user device 150, e.g., via the agent application 152, and/or the compliance server 130, e.g., via the management application, for compliance with the compliance rules.

In some embodiments, the agent application 152 may perform a set of ordered operations to accomplish a requested function. These operation sets may be defined on, e.g., stored in a memory of, the user device(s) 150 and/or the compliance server 130 and may comprise one or more operations to determine whether the user device is in compliance with compliance rules from the compliance rule store 134. The agent application 152 may control at least one respective computing resource of the user device(s) 150. The operations may include configuring at least one respective computing resource of the user device(s) such as restricting access to at least one resource managed by the agent application 152, such as one or more of the resources 256 depicted in FIG. 2.

As shown in FIG. 1, the user device(s) 150, compliance server 130, and/or resource server 110 may communicate with one another directly and/or via the network 140. The user device(s) 150, compliance server 130, and/or resource server 110 may connect to the network 140 via wired or wireless means, such as via one or more intermediate networks. For example, the user device(s), compliance server 130, and/or resource server 110 may connect with the network 140 via wired means such as Ethernet, USB (Universal Serial Bus), or the like, or via wireless means such as, for example, WI-FI, BLUETOOTH, or the like, or by connecting with a wireless cellular network, such as a Long Term Evolution (LTE) network, an LTE-Advanced (LTE-A) network, a Global Systems for Mobile communications (GSM) network, a Code Division Multiple Access (CDMA) network, e.g., a Wideband CDMA (WCDMA) network, a CDMA2000 network or the like, a General Packet Radio Service (GPRS) network or other type of network.

Accordingly, the Network 140 may comprise, for example, one or more wired and/or wireless networks such as one or more wireless local area networks (WLAN), wireless wide area networks (WWAN), Ethernet networks, fiber-optic networks, and/or any other type of wired and/or wireless network now known or later developed. Additionally, the Network 140 may comprise the Internet and/or one or more intranets, extranets, microwave networks, satellite communications networks, cellular networks, infrared communication networks, global area networks, or other suitable networks, etc., or any combination of such networks.

Figure 2:
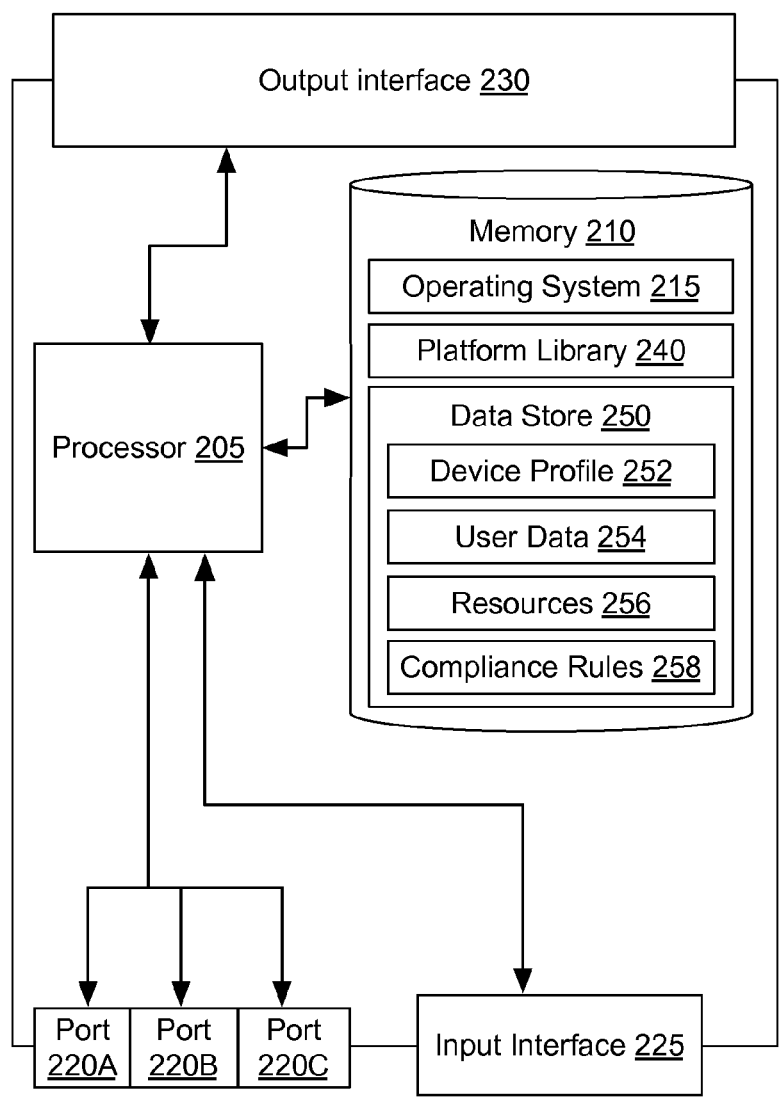
FIG. 2 is a schematic representation of an example user device which may be configured according to example embodiments of the present invention.

Turning now to FIG. 2, a diagram of an example user device 150 is depicted. While FIG. 2 illustrates one example configuration of such a user device, numerous other configurations may be used according to some example embodiments. With reference to FIG. 2, however, the user device 150 may comprise a processor 205, e.g., at least one processor, co-processor, and/or processing circuitry, and at least one memory 210. Depending on the configuration and type of device, the memory 210 may comprise, but is not limited to, volatile (e.g. random access memory (RAM)), non-volatile (e.g. read-only memory (ROM)), flash memory, or any combination thereof. The memory 210 may store executable programs, e.g., program code instructions, and related data components of various applications and modules for execution by the processor 205. The at least one memory 210 may be communicatively connected to the at least one processor 205, e.g., via one or more system busses for transferring data therebetween.

Basic functionality of the user device 150 may be provided by an operating system 215 contained in the at least one memory 210 and executed via the at least one processor 205. One or more programmed software applications may be executed by utilizing the computing resources in user device 150. For example, applications stored in the memory 210 may be executed by the processor 205 under the auspices of operating system 215. For example, processor 205 may be configured to execute applications such as web browsing applications, email applications, instant messaging applications, applications configured to view and/or manipulate content, and/or other applications capable of receiving and/or providing data.

Data provided as input to and/or generated as output from the application(s) may be stored in the memory 210 and read by the processor 205 from the memory 210 as needed during the course of application program execution. Input data may be data stored in the memory 210 by a secondary application or other source, either internal or external to user device 150, or provided during installation of the application.

The user device 150 may include one or more communication ports, such as the communication ports 220(A)-(C) depicted in FIG. 2. It will be understood that although three communication ports are depicted in the example user device 150 depicted in FIG. 2, any number of such ports may be present according to other example configurations of a user device 150. Such communication ports 120(A)-(C) may allow the user device 150 to communicate with other devices, such as other user devices 150, the compliance server 130, and/or the resource server 110, and may comprise components such as a wireless network connectivity interface, an Ethernet network adapter, and/or a modem. For example, the wireless network connectivity interface may comprise one and/or more of a wireless radio transceiver, PCI (Peripheral Component Interconnect) card, USB (Universal Serial Bus) interface, PCMCIA (Personal Computer Memory Card International Association) card, SDIO (Secure Digital Input-Output) card, NewCard, Cardbus, a modem, and/or the like. According to some embodiments, the communication ports 120(A)-(C) may additionally or alternatively include one or more antennas, supporting hardware and/or software, and/or supporting circuitry configured to receive and/or transmit signals according to any short-range communication protocols and/or standards, such as, for example, near field communication (NFC), BLUETOOTH, and/or BLUETOOTH Low Energy (BLE). According to some embodiments, the communication ports 120(A)-(C) may additionally or alternatively include one or more interfaces configured to provide location services, such as one or more antennas, supporting hardware and/or software, and/or supporting circuitry configured to receive signals transmitted from GPS satellites.

The user device 150 may also receive data as user input via an input interface 225, such as one or more of a keyboard, a mouse, a pen, a stylus, a sound input device, a touch input device, a biometric device, a capture device, a brain-computer interface (BCI), etc. The input interface 225 may additionally or alternatively comprise one or more sensing devices, such as one or more cameras, microphones, motion detectors, proximity sensors, and/or the like, which may be configured to capture visual, aural, physical, and/or other types of stimuli, such as spoken words, motions, gestures, and/or the like.

Data generated by applications may be caused to be stored in the memory 210 by the processor 205 during the course of application program execution. Data may be provided to the user of the user device 150 during application program execution by means of an output interface 230. The output interface 230 may comprise one or more devices configured to provide information and/or stimuli to a user, such as one or more display devices; speakers; force, vibration, and/or haptic feedback generating devices; implanted and/or physiologically-integrated output devices; and/or the like. It will be understood that although the input and output interfaces 225, 230 are depicted as distinct components in FIG. 2, they may, according to example embodiments, be embodied by one or more components comprising both input and output functionality. For example, the input and output interface 225, 230 may comprise a touchscreen device, e.g., a display device configured to both display information and receive user input, such as via a touch detection interface.

The at least one memory 210 may also comprise a platform library 240. The platform library 240 may comprise one or more collections of functionality, e.g., utilities, useful to multiple applications, such as may be provided by an application programming interface (API) to a software development kit (SDK). These utilities may be accessed by applications as necessary so that each application does not have to contain these utilities, thus allowing for memory consumption savings and a consistent user experience.

Furthermore, embodiments of this disclosure may be practiced in conjunction with a graphics library, other operating systems, or any other application program and is not limited to any particular application or system. The devices described with respect to the Figures may have additional features or functionality. For example, user device 150 may also include additional data storage devices (removable and/or non-removable) such as, for example, magnetic disks, optical disks, or tape (not shown).

The user device 150 may store in the memory 210, e.g., in a data store 250, a device profile 252 and user data 254. The device profile 252 may, for example, comprise information such as an indication of a current position of user device 150 and/or indications of various hardware, software, and/or security attributes pertaining to the user device 150. For instance, the device profile 252 may represent hardware specifications of the user device 150, version and/or configuration information of various software program and/or hardware components installed on user device 150, data transmission protocols enabled on user device 150, version and usage information of the various resources 256 stored on user device 150, and/or any other attributes associated with the state of user device 150. The device profile 252 may additionally or alternatively comprise operational status information, such as information regarding any errors or faults detected in the user device 150; information regarding device temperature; information regarding resource levels such as battery levels, free storage space, and/or signal strengths; and/or the like. The device profile 252 may additionally or alternatively comprise data indicating a date of last virus scan of the user device 150, a date of last access of the user device 150 by an IT representative, a date of last service of the user device 150 by an IT representative, and/or any other data indicating maintenance and/or usage of the user device 150. The device profile 252 may additionally or alternatively comprise indications of past behavior of associated users, such as resources accessed, charges for resource accesses, and/or inventory accessed from such resources.

The user data 254 may comprise information regarding one or more users of the user device 150. For example, the user data 254 may comprise one or more user preferences, e.g., one or more parameters that may affect the experience of the user. Additionally or alternatively, the user data 254 may include indications of a device user's age, gender, bodily traits, preferred resource types, preferred venue resources, and/or any other type of information relating to a user or combinations of such information. Additionally or alternatively, the user data 254 may include indications of one or more access levels, roles, policy groups, or the like of a device user, e.g., for use in providing varying levels of functionality and/or access (e.g., to protected content), for different users of a given user device.

The user device 150 may also store at least one resource 256 in the data store 250. The resources 256 may, for example, include any data or content, such as databases, applications, audio/video content, electronic records, applications and/or application files, and/or the like. More specifically, resources 256 may include at least one of the following file types: data files, audio files, video files, three-dimensional image files, raster image files, vector image files, page layout files, text files, word processor files, spreadsheet files, presentation files, graphic files, audio files, photographic files, video files, database files, executable files, CAD files, web files, plug-in files, font files, system files, settings files, encoded files, compressed files, disk image files, developer files, backup files, and/or any other files.

Figure 3:
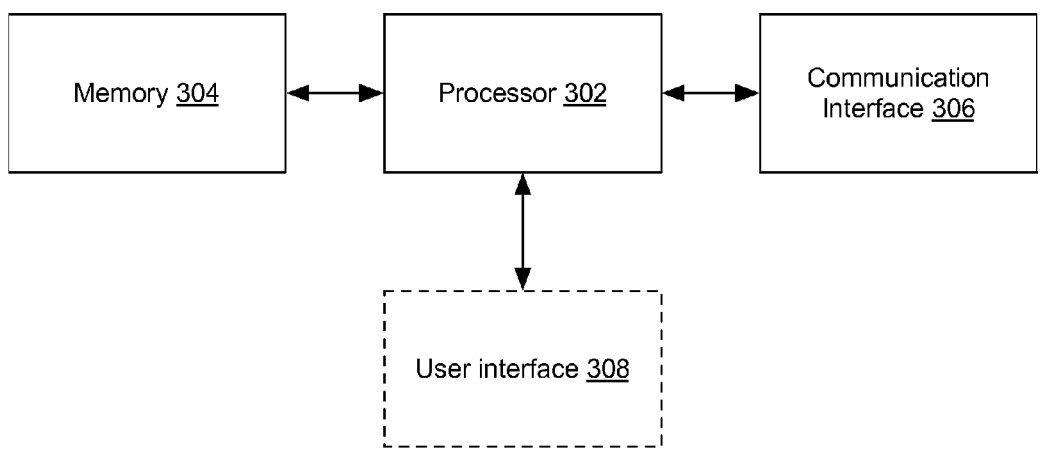
FIG. 3 is a schematic representation of an example apparatus that may be embodied by or otherwise associated with one or more electronic devices and which may be configured to implement example embodiments of the present invention.

Example embodiments of the invention will now be described with reference to FIG. 3, in which certain elements of an apparatus 300 for implementing various functionality of the present invention are depicted. In order to implement such functionality, the apparatus 300 of FIG. 3 may be employed, for example, in conjunction with one or more of the user device(s) 150, the compliance server 130, and/or the resource server 110 depicted in FIG. 1. However, it should be noted that the apparatus 300 of FIG. 3 may also be employed in connection with a variety of other devices, both mobile and fixed, in order to implement the various functionality of the present invention and therefore, embodiments of the present invention should not be limited to those depicted. It should also be noted that while FIG. 3 illustrates one example of a configuration of an apparatus 300 for implementing the functionality of the present invention, numerous other configurations may additionally or alternatively be used to implement embodiments of the present invention. Accordingly, it will be understood that various devices, components, and/or elements depicted and/or described as being in communication with each other may, for example, be embodied within a single device or distributed across multiple devices.

Referring now to FIG. 3, the apparatus 300 for providing individual-specific content management according to some example embodiments of the present invention may include or otherwise be in communication with a processor 302, a communication interface 306, and a memory device 304. As described below and as indicated by the dashed lines in FIG. 3, the apparatus 300 may also include a user interface 308, such as when the apparatus 300 is embodied by or otherwise associated with the user device 150. In some embodiments, the processor 302 (and/or co-processors or other processing circuitry assisting or otherwise associated with the processor 302) may be in communication with the memory device 304 via a bus configured to pass information among components of the apparatus 300. The memory device 304 may, for example, include one or more volatile and/or non-volatile memories. The memory device 304 may be configured to store information, data, content, applications, instructions, or the like, for enabling the apparatus 300 to carry out various functions in accordance with an example embodiment of the present invention. For example, the memory device 304 may be configured to store instructions, such as program code instructions, that, when executed by the processor 302, cause the apparatus 300 to carry out various operations.

The processor 302 may be embodied in a number of different ways. For example, the processor 302 may be embodied as one or more of a variety of hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 302 may include one or more processing cores configured to perform independently. A multi-core processor may enable multiprocessing within a single physical package. Additionally or alternatively, the processor 302 may include one or more processors configured in tandem via the bus to enable independent execution of instructions, pipelining and/or multithreading.

In an example embodiment, the processor 302 may be configured to execute instructions stored in the memory device 304 or otherwise accessible to the processor 302. Alternatively or additionally, the processor 302 may be configured to execute hard coded functionality. As such, whether configured by hardware or software methods, or by a combination thereof, the processor 302 may represent an entity (e.g., physically embodied in circuitry) capable of performing operations according to an embodiment of the present invention while configured accordingly. Thus, for example, when the processor 302 is embodied as an ASIC, FPGA or the like, the processor 302 may be specifically configured hardware for conducting the operations described herein. Alternatively, as another example, when the processor 302 is embodied as an executor of software instructions, the instructions may specifically configure the processor 302 to perform the algorithms and/or operations described herein when the instructions are executed. However, in some cases, the processor 302 may be a processor of a specific device (e.g., the user device 150, compliance server 130, and/or resource server 110) configured to employ an embodiment of the present invention by further configuration of the processor 302 by instructions for performing the algorithms and/or operations described herein. The processor 302 may include, among other things, a clock, an arithmetic logic unit (ALU) and logic gates configured to support operation of the processor 302.

The communication interface 306 may be any means such as a device or circuitry embodied in either hardware or a combination of hardware and software that is configured to receive and/or transmit data from/to a network, such as the network 140, and/or any other device or module in communication with the apparatus 300. In this regard, the communication interface 306 may include, for example, an antenna (or multiple antennas) and supporting hardware and/or software for enabling communications with a wireless communication network. Additionally or alternatively, the communication interface 306 may include the circuitry for interacting with the antenna(s) to cause transmission of signals via the antenna(s) or to handle receipt of signals received via the antenna(s). Additionally or alternatively, the communication interface 306 may include one or more antennas, supporting hardware and/or software, and/or supporting circuitry for receiving and/or transmitting signals according to any short-range communication protocols and/or standards, such as, for example, NFC, BLUETOOTH, and/or BLE. In some environments, the communication interface 306 may alternatively or also support wired communication. As such, for example, the communication interface 306 may include a communication modem and/or other hardware/software for supporting communication via cable, digital subscriber line (DSL), universal serial bus (USB) or other mechanisms.

In some embodiments, such as instances in which the apparatus 300 is embodied by or otherwise associated with the user device 150, the apparatus 300 may include a user interface 308 in communication with the processor 302 to receive indications of user input and/or to cause audible, visual, mechanical or other output to be provided to the user. As such, the user interface 308 may, for example, include a keyboard, a mouse, a joystick, a display, a touch screen, touch areas, soft keys, a microphone, a speaker, a BCI, or other input/output mechanisms and/or devices, such as any of those discussed above in the context of the input/output interfaces 225, 230 depicted in FIG. 2. The processor 302 may be configured to control one or more functions of one or more user interface elements through computer program instructions (e.g., software and/or firmware) stored on a memory accessible to the processor 302 (e.g., memory device 304). In other embodiments, however, such as in instances in which the apparatus 300 is embodied by the compliance and/or resource server 130, 110, the apparatus 300 may not include a user interface 308.

It will be further understood that in embodiments in which the apparatus 300 is embodied by or otherwise associated with the user device 150, the memory device 304 may, for example, be embodied by the memory 210 depicted in FIG. 2; the processor 302 may, for example, be embodied by the processor 205 depicted in FIG. 2; the user interface 308 may, for example, be embodied by the input and/or output interfaces 225, 230 depicted in FIG. 2; and/or the communication interface 306 may, for example, be embodied by one or more of the communications ports 220A-C depicted in FIG. 2.

Figure 4:
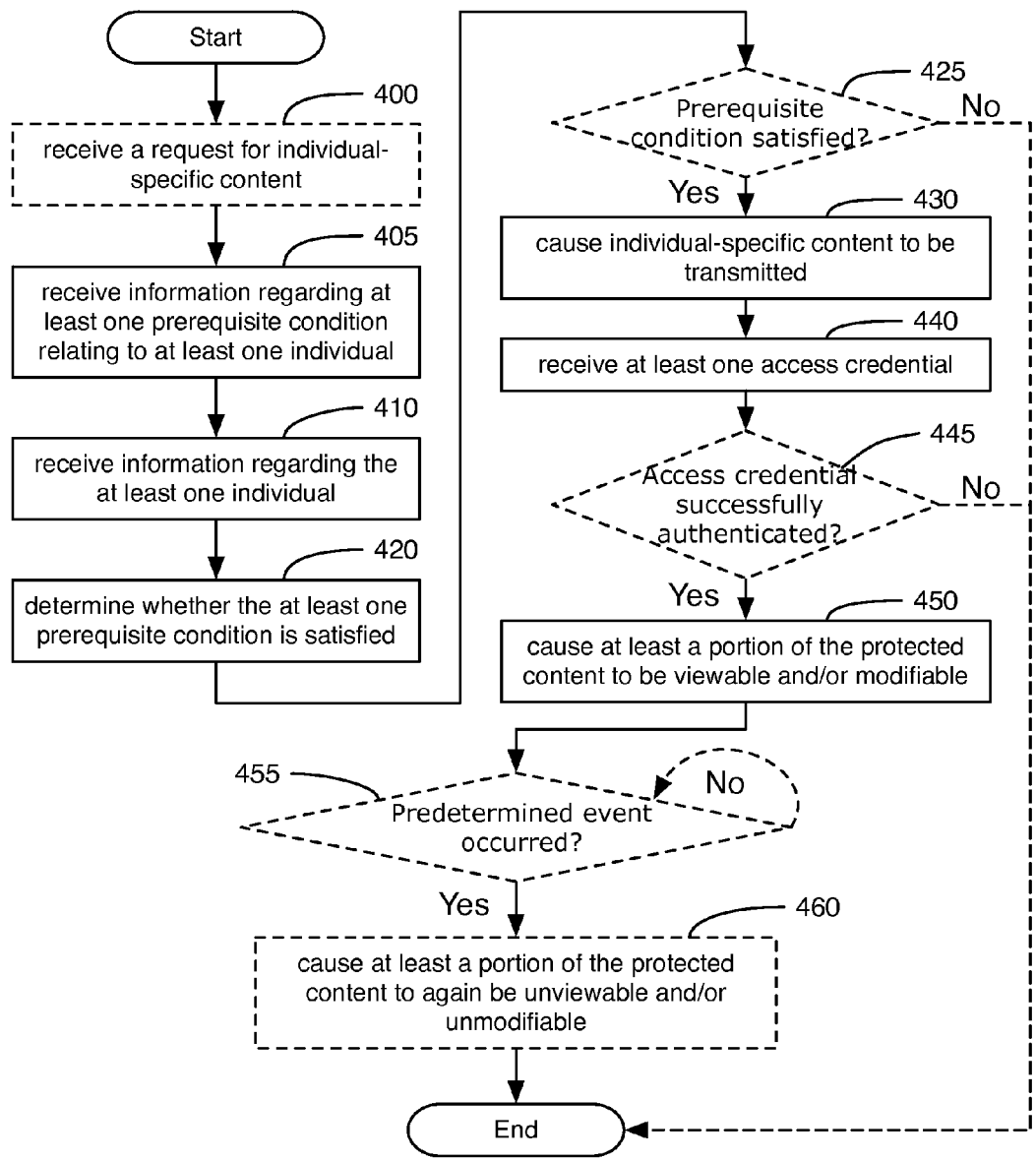
FIGS. 4 and 5 are flowcharts illustrating operations that may be performed in accordance with example embodiments of the present invention.
Figure 5:
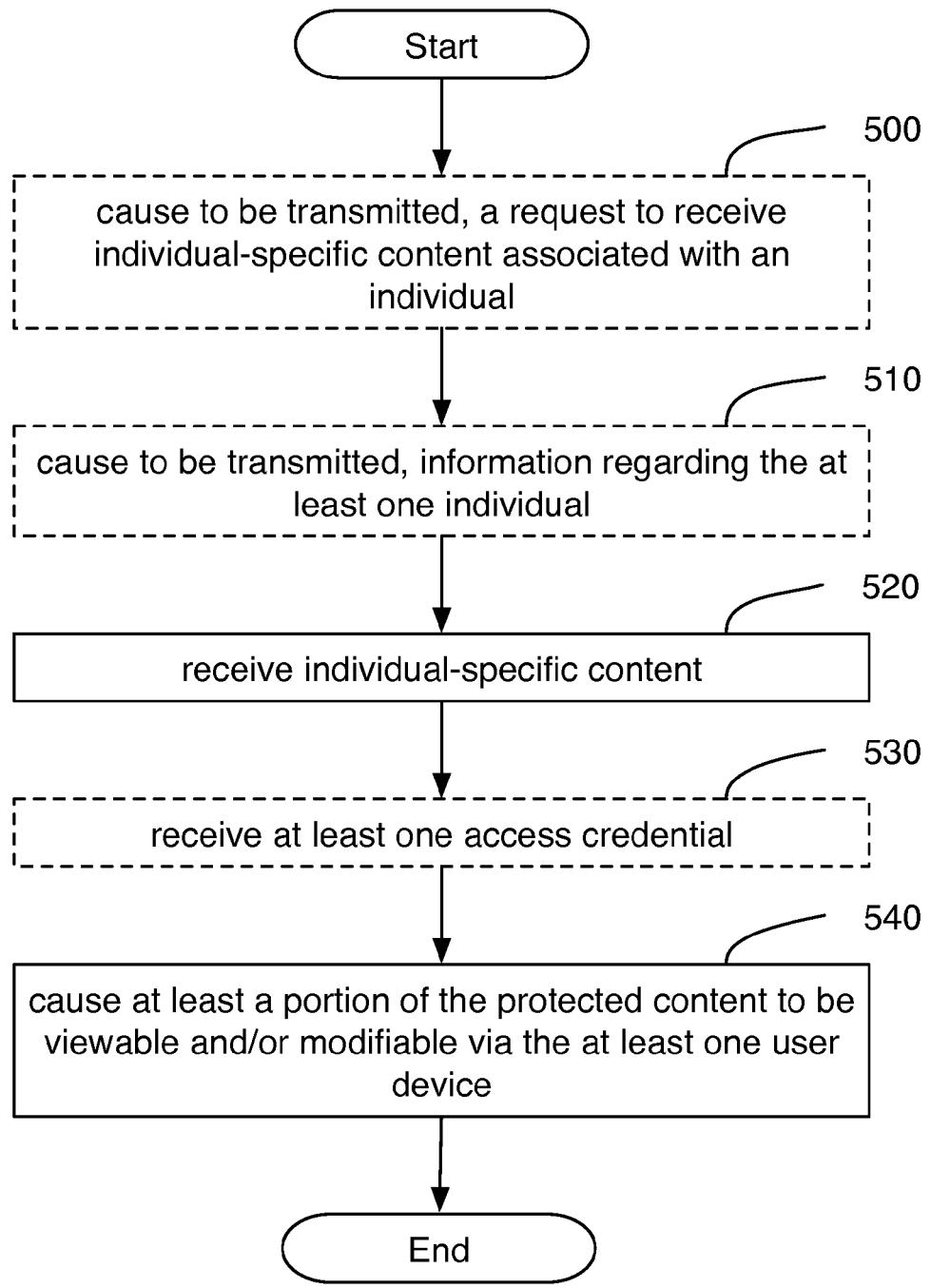

Referring now to FIGS. 4 and 5, various operations of an example embodiment of the present invention are depicted. As discussed below, the operations of FIGS. 4 and/or 5 may be performed by one or more apparatuses, such as the apparatus 300 depicted in FIG. 3, embodied by or otherwise associated with one or more of the user device(s) 150, compliance server 130, and/or resource server 110 depicted in FIG. 1, so as to provide individual-specific content management capabilities.

In this regard, and turning first to FIG. 4, the apparatus 300 embodied by or otherwise associated with the compliance server 130, resource server 110, and/or user device 150 may, according to some example embodiments, include means, such as the processor 302, the memory 304, the communication interface 306, and/or the like, for receiving a request for individual-specific content. See operation 400. The request may, for example, be received from a user device 150 on which the individual-specific content will be viewed and/or modified. The request may, according to some embodiments, comprise a general request for any suitable individual-specific content. That is, the request may comprise a request for the apparatus 300 embodied by or otherwise associated with the compliance server 130 and/or resource server 110 to determine, e.g., based on information regarding at least one individual, what particular individual-specific content should be transmitted. For example, the apparatus 300 may be configured to respond to a generalized request by determining, e.g., based on scheduling information, one or more individuals scheduled for an appointment at a current time and to cause individual-specific content associated with the determined one or more individuals to be transmitted. According to some example embodiments, the request may comprise a specific request, e.g., for particular individual-specific content or for any individual-specific content associated with a particular individual.

According to some example embodiments, the apparatus 300 embodied by or otherwise associated with the compliance server 130, resource server 110, and/or user device 150 may further include means, such as the processor 302, the memory 304, the communication interface 306, and/or the like, for receiving information regarding at least one prerequisite condition relating to at least one individual. See operation 405. The information regarding the at least one prerequisite condition relating to the at least one individual may, for example, comprise information defining one or more prerequisite conditions that must be satisfied before allowing access to individual-specific content. For example, the information may define one or more prerequisite conditions that must be satisfied before individual-specific content pertaining to the at least one individual is transmitted, made viewable, and/or made modifiable. The information may additionally define one or more relationships between the one or more prerequisite conditions and the viewability and/or modifiability of one or more portions of the protected individual-specific content, thereby allowing the viewability and/or modifiability of each of one or more portions of protected individual-specific content to be made independently contingent on one or more prerequisite conditions.

Examples of such prerequisite conditions relating to the at least one individual may, for example, include prerequisite conditions relating to the at least one individual's physical presence and/or consent, and/or the existence of an appropriate circumstance for allowing access to the individual-specific content. For example, the at least one prerequisite condition may, according to some embodiments, comprise the individual being scheduled for an appointment at a particular time, and/or a location of the individual being within a predetermined proximity of a particular location or a particular electronic device (e.g., user device) that is to receive individual-specific content associated with the individual. According to some example embodiments, the one or more prerequisite conditions may comprise receipt of an indication of presence and/or consent being received, such as from a user device 150 associated with the at least one individual. For example, an individual may "check in" for an appointment, e.g., via their user device 150 and/or an electronic device provided on-site, so as to cause transmission of the indication and thereby satisfy the prerequisite condition.

According to some example embodiments, the at least one prerequisite condition may additionally or alternatively relate to one or more intake survey responses provided by the at least one individual. For example, one or more intake survey responses provided by the at least one individual may be compared to one or more prior intake survey responses provided by the at least one individual and a degree of similarity may be determined. Accordingly, the information regarding the at least one prerequisite condition may comprise a threshold degree of similarity between a present and one or more prior intake survey responses.

According to an example embodiment, the apparatus 300 embodied by or otherwise associated with the compliance server 130, resource server 110, and/or user device 150 may further include means, such as the processor 302, the memory 304, the communication interface 306, and/or the like, for receiving information regarding the at least one individual. See operation 410. The information regarding the at least one individual may, for example, comprise any information related to the individual that may be used by the apparatus 300 to determine whether the at least one prerequisite condition is satisfied. For example, the information regarding the at least one individual may, according to some embodiments, comprise scheduling information, e.g., information regarding if/when the at least one individual is scheduled for an appointment. According to some example embodiments, the information regarding the at least one individual may additionally or alternatively comprise information regarding at least one user device of the at least one individual, such as an indication of a current position of the user device, and/or any of the device profile information discussed above. According to some other example embodiments, the information regarding the at least one individual may additionally or alternatively comprise survey response information.

According to a further embodiment, the apparatus 300 embodied by or otherwise associated with the compliance server 130, resource server 110, and/or user device 150 may include means, such as those discussed above, for determining whether the at least one prerequisite condition is satisfied. See operation 420. The apparatus 300 may determine whether the at least one prerequisite condition is satisfied based at least in part on the information regarding the at least one prerequisite condition and the information regarding the at least one individual.

The apparatus 300 embodied by or otherwise associated with the compliance server 130, resource server 110, and/or user device 150 may further include means, such as the processor 302, the memory 304, the communication interface 306, and/or the like, for causing individual-specific content to be transmitted, e.g., to at least one user device 150. See operation 430. For example, according to some embodiments, an apparatus 300 embodied by or otherwise associated with the compliance server 130 may direct the compliance server 110 to transmit the individual-specific content. According to some other example embodiments, an apparatus 300 embodied by or otherwise associated with a user device 150, e.g., a user device associated with the individual associated with the individual-specific content, may cause the individual-specific content to be transmitted. At least a portion of the individual-specific content may comprise protected content that is configured to prevent viewing and/or modification. For example, the protected content may be encrypted, obfuscated, or otherwise configured to be unviewable and/or unmodifiable, e.g., via the at least one user device 150.

The apparatus 300 embodied by or otherwise associated with the compliance server 130, resource server 110, and/or user device 150 may further include means, such as the processor 302, the memory 304, the communication interface 306, and/or the like, for receiving at least one access credential. See operation 440. The at least one access credential may, for example, be associated with the at least one individual with which the individual-specific content is associated. For example, the at least one access credential may, according to some embodiments, comprise an identifier known to the individual, such as a social security number, password, PIN or the like. According to some other example embodiments, the at least one access credential may additionally or alternatively comprise a biometric signature, such as a fingerprint, iris pattern, voice pattern, or other verifiable physical feature of the at least one individual with which the individual-specific content is associated. The at least one access credential may, according to some example embodiments, be transmitted to the apparatus 300 by a user device 150, such as the user device 150 that received the individual-specific content, that is configured to receive the access credential, such as via a user interface, scanning device, or the like.

According to other example embodiments, the at least one access credential may additionally or alternatively comprise a code provided by a device or object associated with the at least one individual with which the individual-specific content is associated, such as an armband or pendant worn by the individual, or a device implanted in the individual. Thus, the at least one access credential may, for example, be received from a device, e.g., a user device 150, that is configured to scan a radio frequency ID (RFID) tag, a quick response (QR) code, or the like included in and/or on a device or object associated with the at least one individual. According to some example embodiments, the at least one access credential may comprise a code provided by an electronic device, such as a user device, security token, wireless transmitter, wearable electronic device (such as a "smart" electronic armband), smart card, or the like associated with the at least one individual. According to some example embodiments, the at least one access credential may comprise a code provided by an electronic device, such as a general purpose computing device or a user device 150, not directly associated with the individual. For example, the code may be provided upon authentication of a user in receipt of the individual-specific content.

According to some example embodiments, the at least one access credential may be provided by an electronic device configured to provide the access credential in response to receiving a challenge response from a user, such as from the at least one individual. The challenge response may comprise any of the identifiers discussed above, such as a password, PIN, biometric signature, or the like. According to some embodiments, the electronic device may, for example, generate a temporary access credential in response to receiving the challenge response, thereby providing only temporary access to the individual-specific content, e.g., limited to a certain period of time and/or number of uses.

Each of the one or more access credentials may, according to some example embodiments, be associated with one or more portions of protected individual-specific content. That is, one or more relationships between the one or more access credentials and one or more portions of the protected individual-specific content may be defined, such as in a memory 304 of the apparatus, thereby allowing the viewability and/or modifiability of each of one or more portions of protected individual-specific content to be independently associated with one or more access credentials. Moreover, access credentials may be associated with one or more roles, policy groups, or the like, such that the viewability and/or modifiability of various portions of protected content may be further dependent on one or more roles associated with a given access credential. For example, a first user who provides an access credential associated with a first role, policy group, or the like may be able to view and modify a particular portion of protected individual-specific content, while a second user who provides a second access credential associated with a second role, policy group, or the like may only be able to view the particular portion. According to some example embodiments, and regardless of the form or source of the at least one access credential, the at least one access credential may comprise, or may be used to determine, one or more keys that may be used to decrypt one or more portions of protected content included in the individual-specific content.

The apparatus 300 embodied by or otherwise associated with the compliance server 130, resource server 110, and/or user device 150 may further include means, such as the processor 302, the memory 304, the communication interface 306, and/or the like, for authenticating the at least one access credential. See operation 445. The access credential may, for example, be authenticated by comparing it against a database of known access credentials.

The apparatus 300 embodied by or otherwise associated with the compliance server 130, resource server 110, and/or user device 150 may further include means, such as the processor 302, the memory 304, the communication interface 306, and/or the like, for causing at least a portion of the protected content to be viewable and/or modifiable, e.g. via the at least one user device 150. See operation 450. For example, the apparatus 300 may be configured to decrypt at least a portion of the protected content. Causing at least a portion of the protected content to be viewable and/or modifiable may, for example, be performed in response to authenticating the at least one access credential and/or determining that the prerequisite condition has been satisfied.

According to some example embodiments, causing at least a portion of the protected content to be viewable and/or modifiable may comprise causing the protected content to be decrypted. For example, the apparatus 300 may cause at least a portion of the protected content to be decrypted by causing a key to be transmitted, such as to the user device 150 that received the individual-specific content. The user device 150 may then use the key to decrypt at least a portion of the protected content so as to allow the protected content to be viewed and/or modified. According to other example embodiments, the apparatus 300 may cause at least a portion of the protected content to be viewable and/or modifiable by causing an instruction to be transmitted, such as to the user device 150. The user device 150 may thus be configured to cause at least a portion of the protected content to be viewable and/or modified, such as via an application executable on the user device 150, in response to receiving the instruction. For example, the user device 150 may be configured to decrypt at least a portion of the protected content, such as by using a key stored in a memory of the user device or provided to the user device 150, e.g., by a user or another electronic device.

As depicted in FIG. 4, one or more of the above operations may be conditioned upon the prerequisite condition being satisfied and/or the at least one access credential being successfully authenticated. See operations 425 and 445. Moreover, it will be understood that the operations depicted in FIG. 4 may occur in many different orders according to various example embodiments. Thus, according to some example embodiments, the apparatus 300 may cause transmission of the individual-specific content only in an instance in which it has determined that the at least one prerequisite condition has been satisfied, as depicted in FIG. 4. According to some other embodiments, the apparatus 300 may cause the individual-specific content to be transmitted (e.g., in response to receiving a request) prior to determining whether the at least one prerequisite condition is satisfied, but may cause at least a portion of the protected content of the individual-specific content to be viewable and/or modifiable only in an instance in which it has determined that the at least one prerequisite condition has been satisfied. According to other example embodiments, the apparatus 300 may cause the individual-specific content to be transmitted in an instance in which it has received (and, according to some embodiments, authenticated) the at least one access credential and/or determined that the prerequisite condition has been satisfied.

The apparatus 300 embodied by or otherwise associated with the compliance server 130 and/or the resource server 110 may further include means, such as the processor 302, the memory 304, the communication interface 306, and/or the like, for detecting an occurrence of at least one predetermined event. See operation 455. The apparatus 300 may further include means, such as those just listed, for causing at least a portion of the protected content that the apparatus 300 had previously caused to be viewable and/or modifiable to again be unviewable and/or unmodifiable. See operation 460. The apparatus 300 may, for example, cause at least a portion of the protected content to again be unviewable and/or unmodifiable by causing a signal to be transmitted to the user device 150, the signal comprising an instruction, code, and/or other information configured to direct and/or enable the user device 150 to cause at least a portion of the protected content to be unviewable and/or unmodifiable, such as by encrypting the portion of the protected content.

According to some example embodiments, the at least one predetermined event may comprise an expiration of a predetermined amount of time. According to some other example embodiments, the at least one predetermined condition may additionally or alternatively comprise the at least one individual with which the individual-specific content is associated being located outside of a predetermined area or a predetermined proximity of a particular location, e.g., a location of the user device 150 that received the individual-specific content. Thus, the apparatus 300 may determine whether the at least one predetermined event has occurred by receiving location information relating to the at least one individual, such as by receiving location information regarding at least one electronic device associated with the at least one individual, e.g., at least one user device 150 associated with the at least one individual, and comparing this location information with the predetermined area or with location information regarding the user device 150 that received the individual-specific content.

It will be understood that various portions of the protected individual-specific content may be made viewable, unviewable, modifiable, and/or unmodifiable independently of one another. For example, a first portion of the protected content may initially (e.g., at the time it is transmitted) be unviewable and unmodifiable, while a second portion may initially be viewable but unmodifiable. Following satisfaction of the at least one prerequisite condition and receipt of the at least one access credential, the first portion may then be made viewable, but not modifiable and the second portion may be made modifiable. This may be achieved, according to some example embodiments, by separately encrypting the various portions of the protected individual-specific content, e.g., using distinct keys.

It will be further understood that any one portion of protected individual-specific content may be made viewable, unviewable, modifiable, and/or unmodifiable in different instances and in response to different occurrences, e.g., satisfaction of different prerequisite conditions, receipt of different access credentials, and/or detection of different predetermined events. For example, a first portion of protected individual-specific content may initially be unviewable and unmodifiable. Following satisfaction of a first prerequisite condition and receipt of a first access credential, the first portion of protected individual-specific content may be made viewable, but remain unmodifiable. Following satisfaction of a second prerequisite condition, the first portion may be made modifiable. Following detection of a first predetermined event, the first portion may again be made unmodifiable, and following detection of a second predetermined event, the first portion may again be made unviewable. Any number of other permutations of the above examples will be understood to be possible and will therefore not be explicitly listed.

A real-world example involving a patient's electronic medical records is useful to understand the above concepts. The patient's electronic medical records may comprise unprotected content, such as the patient's name, date of birth, and/or address, and protected content, such as the patient's medical history. These electronic medical records may be transmitted to a user device 150 associated with the patient's doctor and all of the protected content, e.g., the entire medical history portion, may initially be unviewable and unmodifiable. Following satisfaction of a first prerequisite condition, such as the patient being scheduled for an appointment in the next hour, and following receipt of a first access credential, the medical history portion of the patient's medical records may be made viewable. The first access credential might, for example, comprise access credentials associated with the doctor, such as a username and password. According to another example, the doctor might log in to a website, such as a website associated with the patient's insurance company, and be provided with the first access credential, such as a unique and/or randomly-generated code, which the doctor may then enter into the doctor's user device 150.

Upon satisfaction of a second prerequisite condition, such as the patient (i.e., an electronic device associated with the patient) being in a predetermined proximity of the doctor's user device 150, the medical history portion of the patient's electronic medical records may be made modifiable. Following a first predetermined event, such as after the patient is no longer within the predetermined proximity, a first portion of the medical history portion of the patient's electronic medical records, such as a portion relating to prior medical history, may again be made unmodifiable, while a second portion, such as a portion for making notes on the just-concluded appointment, may remain modifiable. Following a second predetermined event, such as expiration of a predetermined amount of time, the second portion may again be made unmodifiable as well, and the entire protected portion may be made unviewable. Thus, some example embodiments may allow very precise control to be exercised over the visibility and/or modifiability of various portions of protected individual-specific content.

It will also be understood that, according to some embodiments, receiving the information regarding the at least one individual and receiving the access credentials may be accomplished in a single action. For example, where a prerequisite condition involves the individual with which the individual-specific content is associated being in proximity of a particular electronic device, receiving an access credential by scanning or receiving a code, such as by scanning a QR code or receiving a short-range transmission, from an object or electronic device on the individual's person may comprise both receiving information regarding the individual (e.g., they are in close enough proximity to the particular electronic device to allow the scanning or reception) and receiving the at least one access credential (the code itself). Similarly, receipt of a biometric signature may comprise both receiving the information regarding the individual (e.g., that they are in close enough proximity to engage with the biometric scanner) and the at least one access credential.

Similarly, some embodiments may utilize this concept of dual-purpose information to provide emergency access options, such as in the case of electronic medical records. For example, the existence of an emergency medical situation may be defined as a prerequisite condition for viewing and/or modifying a protected portion of an individual's electronic medical records. For example, some embodiments may provide the existence of an emergency medical situation involving the individual as a prerequisite condition for making all protected content viewable. Receiving a specific emergency access credential may thus comprise both receiving information regarding the individual (that the individual is involved in an emergency medical situation) and receiving the at least one access credential. Thus, some embodiments may allow protected individual-specific content to be received, made viewable and/or made modifiable, by performing a single action which comprises both receiving at least one access credential and receiving information regarding the at least one individual sufficient to determine satisfaction of the prerequisite condition.

Having thus described various functionality that may be provided in association with a compliance server 130 and/or a resource server 110, attention will be turned to FIG. 5 to discuss corresponding functionality that may be provided in association with a user device 150. In this regard, an apparatus, such as the apparatus 300 depicted in FIG. 3, may be embodied by or otherwise associated with the user device 150 and may comprise means for carrying out the operations depicted in FIG. 5.

For instance, the apparatus 300 embodied by or otherwise associated with the user device 150 may include means, such as the at least one processor 302, the at least one memory 304, the communication interface 306, the user interface 308, and/or the like for causing a request to receive individual-specific content to be transmitted, e.g., to the compliance server 130 and/or resource server 110. See operation 500. As discussed above, the request may, for example, comprise a general or specific request.

According to another example embodiment, the apparatus 300 embodied by or otherwise associated with the user device 150 may include means, such as the at least one processor 302, the at least one memory 304, the communication interface 306, the user interface 308, and/or the like for causing information regarding the at least one individual with which the individual-specific content is associated to be transmitted. See operation 510. According to some example embodiments, the apparatus 300 embodied by or otherwise associated with the user device 150 may cause information regarding the individual that is stored on the device, e.g., in the at least one memory 304, to be transmitted and/or may direct another device, such as a resource server 110 or the like, to cause information stored in a memory of the other device to be transmitted.

According to some example embodiments, the apparatus 300 embodied by or otherwise associated with the user device 150 may further include means, such as those listed above, for receiving the information regarding the at least one individual. For example, the apparatus 300 may comprise means, such as the user interface 308, for receiving one or more responses to an intake survey. As another example, the apparatus 300 may be configured to receive information regarding a location of the individual, such as a short-range communication signal from an electronic device associated with the individual. According to yet another example, the apparatus 300 may be configured to receive the information regarding the individual via a sensing device communicatively associated with the apparatus 300. For example, the sensing device may comprise a camera or the like configured to read a QR code associated with the patient, or a biometric scanner configured to receive a biometric signature of the individual.

According to another example embodiment, the apparatus 300 embodied by or otherwise associated with the user device 150 may include means, such as the at least one processor 302, the at least one memory 304, the communication interface 306, and/or the like for receiving individual-specific content. See operation 520. As discussed above, at least a portion of the individual-specific content may comprise protected content that is configured to be unviewable and/or unmodifiable via the user device 150, e.g., via the user interface 308 of the apparatus 300 embodied by or otherwise associated with the user device. For example, the protected content may be encrypted, obfuscated, or otherwise configured to be unviewable and/or unmodifiable, e.g., via the at least one user device 150.

According to another example embodiment, the apparatus 300 embodied by or otherwise associated with the user device 150 may include means, such as the at least one processor 302, the at least one memory 304, the communication interface 306, the user interface 308, and/or the like for receiving at least one access credential. See operation 530. In this regard, and as discussed above, the apparatus 300 may be configured to receive the at least one access credential, such as be receiving user input, receiving input from a scanning device, or any other method. According to some example embodiments, the apparatus 300 may further include means, such as those mentioned above, for causing the at least one access credential to be transmitted, e.g., to the compliance server 130 to be authenticated. According to some other example embodiments, the apparatus 300 may include means, such as the at least one processor 302, the at least one memory 304, and/or the like, for authenticating the at least one access credential, such as by comparing the at least one access credential to a database of known access credentials.

According to another example embodiment, the apparatus 300 embodied by or otherwise associated with the user device 150 may include means, such as the at least one processor 302, the at least one memory 304, the communication interface 306, the user interface 308, and/or the like for causing at least a portion of the protected individual-specific content to be viewable and/or modifiable. See operation 540. As discussed above, the apparatus 300 may, for example, cause at least a portion of the protected content to be viewable and/or modifiable by decrypting the portion of the protected content, such as by using one or more keys received from the compliance server 130 and/or resource server 110. According to another example embodiment, the apparatus 300 may decrypt the protected content using one or more keys stored in memory, such as the memory 304, in response to an instruction received, for example, from the compliance server 130.

According to some example embodiments, the apparatus 300 may further include means, such as the at least one processor 302, the at least one memory 304, the communication interface 306, the user interface 308, and/or the like, for causing at least a portion of the individual-specific content to be displayed, for receiving user input, and/or for causing the individual-specific content to be modified based at least in part on the received user input. The apparatus 300 may, according to some example embodiments, further include means, such as the at least one processor 302, the at least one memory 304, the communication interface 306, and/or the like, for causing the modified individual-specific content to be transmitted, such as to the resource server 110, the compliance server 130, and/or another user device 150.

As described above, FIGS. 4 and 5 illustrate flowcharts of example apparatuses 300, methods, and computer program products according to example embodiments of the invention. It will be understood that each block of the flowchart, and combinations of blocks in the flowchart, may be implemented by various means, such as hardware, firmware, processor, circuitry, and/or other devices associated with execution of software including one or more computer program instructions. For example, one or more of the procedures described above may be embodied by computer program instructions.

In this regard, the computer program instructions which embody the procedures described above may be stored by a memory device 304 of an apparatus 300 employing an embodiment of the present invention and executed by a processor 302 of the apparatus 300. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowchart support combinations of means for performing the specified functions and combinations of operations for performing the specified functions for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. For example, in some embodiments, certain ones of the operations described above may be modified or enhanced. Furthermore, in some embodiments, additional optional operations may be included. Modifications, additions, or enhancements to the operations above may be performed in any order and in any combination.

Accordingly, different combinations of elements and/or functions than those explicitly described above are also contemplated as may be set forth in some of the appended claims. Although specific terms are employed herein, they are used in a generic and descriptive sense only and not for purposes of limitation.

All rights including copyrights in the code included herein are vested in and the property of the Assignee. The Assignee retains and reserves all rights in the code included herein, and grants permission to reproduce the material only in connection with reproduction of the granted patent and for no other purpose.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
   receiving information regarding at least one prerequisite condition relating to at least one individual;
   receiving information regarding the at least one individual;
   determining, based at least in part on the information regarding the at least one prerequisite condition and the information regarding the at least one individual, whether the at least one prerequisite condition is satisfied;
   causing to be transmitted, individual-specific content associated with the at least one individual, at least a portion of the individual-specific content comprising protected content that is configured to be unviewable or unmodifiable via at least one user device;
   receiving at least one access credential;
   causing, following receiving the at least one access credential and determining that the at least one prerequisite condition is satisfied, at leas a portion of the protected content to be viewable or modifiable via the at least one user device; and
   in response to detecting an occurrence of at least one predetermined event occurring after causing the at least a portion of the protected content to be viewable or modifiable, causing at least a portion of the protected content to again be unviewable or unmodifiable via the at least one user device.

2. The method of claim 1, wherein:
   causing content comprising one or more electronic records pertaining to the at least one individual to be transmitted comprises:
      causing content comprising one or more electronic records pertaining to the at least one individual to be transmitted in an instance in which it is determined that the at least one prerequisite condition is satisfied.

3. The method of claim 1, wherein:
   causing content comprising one or more electronic records pertaining to the at least one individual to be transmitted comprises:
      causing content comprising one or more electronic records pertaining to the at least one individual to be transmitted in an instance in which it is determined that the at least one prerequisite condition is satisfied and the at least one access credential has been successfully authenticated.

4. The method of claim 1, wherein:
   the information regarding the at least one individual comprises schedule information; and
   determining, based at least in part on the information regarding the at least one prerequisite condition and the information regarding the at least one individual, whether the at least one prerequisite condition is satisfied comprises:
      determining, based at least in part on the schedule information, whether the at least one individual is scheduled for an appointment corresponding to a particular time.

5. The method of claim 1, wherein:
   the information regarding the at least one individual comprises location information; and
   determining, based at least in part on the information regarding the at least one prerequisite condition and the information regarding the at least one individual, whether the at least one prerequisite condition is satisfied comprises:
      determining, based at least in part on the location information, whether the at least one user device is within a predetermined proximity to a location associated with the at least one individual.

6. The method of claim 1, wherein:
   the information regarding the at least one prerequisite condition comprises survey response information; and
   determining, based at least in part on the information regarding the at least one prerequisite condition and the information regarding the at least one individual, whether the at least one prerequisite condition is satisfied comprises:
      determining, based at least in part on the survey response information, whether a degree of similarity between the survey response information and prior survey information satisfies a predetermined threshold.

7. The method of claim 1, wherein:
   the at least one predetermined event comprises an expiration of a predetermined amount of time.

8. The method of claim 1, wherein:
   the at least one predetermined event comprises a first predetermined event; and
   causing at least a portion of the protected content to again be unviewable or unmodifiable via the at least one user device in response to detecting the occurrence of the at least one predetermined event comprises:
      causing a first portion of the protected content to be unviewable or unmodifiable via the at least one user device in response to detecting the occurrence of the first predetermined event, and
      causing a second portion of the protected content to be unviewable or unmodifiable via the at least one user device in response to detecting an occurrence of a second predetermined event.

9. The method of claim 1, wherein:
   receiving the at least one access credential associated with the at least one individual comprises receiving the at least one access credential via at least one sensor associated with the at least one user device.

10. The method of claim 9, wherein:
    the at least one sensor comprises a wireless receiver.

11. The method of claim 9, wherein:
    the at least one sensor comprises a biometric sensor.

12. The method of claim 1, wherein:
receiving the at least one access credential associated with the at least one individual comprises receiving the at least one access credential from a separate electronic device associated with the at least one individual.

13. The method of claim 12, wherein:
the separate electronic device associated with the at least one individual is configured to provide the at least one access credential in response to receiving a challenge response.

14. The method of claim 1, wherein:
the protected content comprises a plurality of portions of protected content, each portion being respectively associated with at least one prerequisite condition and at least one access credential; and
causing, following receiving the at least one access credential and determining that the at least one prerequisite condition is satisfied, at least a portion of the protected content to be viewable or modifiable via the at least one user device comprises:
 causing, for each portion of protected content, following receiving the at least one access credential associated with the portion and determining that the at least one prerequisite condition associated with the portion is satisfied, the portion to be viewable or modifiable via the at least one user device.

15. An apparatus comprising at least one processor and at least one memory storing program code instructions, the at least one memory and program code instructions being configured to, with the at least one processor, direct the apparatus to at least:
receive information regarding at least one prerequisite condition relating to at least one individual;
receive information regarding the at least one individual;
determine, based at least in part on the information regarding the at least one prerequisite condition and the information regarding the at least one individual, whether the at least one prerequisite condition is satisfied;
cause to be transmitted, individual-specific content associated with the at least one individual, at least a portion of the individual-specific content comprising protected content that is configured to be unviewable or unmodifiable via at least one user device;
receive at least one access credential;
cause, following receiving the at least one access credential and determining that the at least one prerequisite condition is satisfied, at least a portion of the protected content to be viewable or modifiable via the at least one user device; and
in response to detecting an occurrence of at least one predetermined event occurring after causing the at least a portion of the protected content to be viewable or modifiable, causing at least a portion of the protected content to again be unviewable or unmodifiable via the at least one user device.

16. The apparatus of claim 15, wherein:
the information regarding the at least one individual comprises schedule information; and
determining, based at least in part on the information regarding the at least one prerequisite condition and the information regarding the at least one individual, whether the at least one prerequisite condition is satisfied comprises:
determining, based at least in part on the schedule information, whether the at least one individual is scheduled for an appointment corresponding to a particular time.

17. The apparatus of claim 15, wherein:
the information regarding the at least one individual comprises location information; and
determining, based at least in part on the information regarding the at least one prerequisite condition and the information regarding the at least one individual, whether the at least one prerequisite condition is satisfied comprises:
determining, based at least in part on the location information, whether the at least one user device is within a predetermined proximity to a location associated with the at least one individual.

18. The apparatus of claim 15, wherein:
the information regarding the at least one prerequisite condition comprises survey response information; and
determining, based at least in part on the information regarding the at least one prerequisite condition and the information regarding the at least one individual, whether the at least one prerequisite condition is satisfied comprises:
determining, based at least in part on the survey response information, whether a degree of similarity between the survey response information and prior survey information satisfies a predetermined threshold.

19. A computer program product comprising a non-transitory computer-readable storage medium having program code portions embodied therein, the program code portions being configured to, upon execution, direct an apparatus to at least:
receive information regarding at least one prerequisite condition relating to at least one individual;
receive information regarding the at least one individual;
determine, based at least in part on the information regarding the at least one prerequisite condition and the information regarding the at least one individual, whether the at least one prerequisite condition is satisfied;
cause to be transmitted, individual-specific content associated with the at least one individual, at least a portion of the individual-specific content comprising protected content that is configured to be unviewable or unmodifiable via at least one user device;
receive at least one access credential;
cause, following receiving the at least one access credential and determining that the at least one prerequisite condition is satisfied, at least a portion of the protected content to be viewable or modifiable via the at least one user device; and
in response to detecting an occurrence of at least one predetermined event occurring after causing the at least a portion of the protected content to be viewable or modifiable, causing at least a portion of the protected content to again be unviewable or unmodifiable via the at least one user device.

* * * * *